(12) United States Patent
Nagano et al.

(10) Patent No.: US 11,614,415 B2
(45) Date of Patent: Mar. 28, 2023

(54) NONDESTRUCTIVE TESTING SYSTEM AND NONDESTRUCTIVE TESTING METHOD

(71) Applicants: Topcon Corporation, Itabashi-ku (JP); RIKEN, Wako-Shi (JP)

(72) Inventors: Shigenori Nagano, Itabashi-ku (JP); Satoru Ishiguro, Itabashi-ku (JP); Yoshie Otake, Wako-Shi (JP); Hideyuki Sunaga, Wako-Shi (JP); Yuichi Yoshimura, Wako-Shi (JP); Koji Ikado, Wako-Shi (JP)

(73) Assignees: Topcon Corporation, Tokyo (JP); RIKEN, Wako (JP)

( * ) Notice: Subject to any disclaimer, the term of this patent is extended or adjusted under 35 U.S.C. 154(b) by 28 days.

(21) Appl. No.: 17/310,856

(22) PCT Filed: Feb. 27, 2020

(86) PCT No.: PCT/JP2020/008172
§ 371 (c)(1),
(2) Date: Aug. 26, 2021

(87) PCT Pub. No.: WO2020/175654
PCT Pub. Date: Sep. 3, 2020

(65) Prior Publication Data
US 2022/0082514 A1    Mar. 17, 2022

(30) Foreign Application Priority Data
Feb. 27, 2019    (JP) .............................. JP2019-034643

(51) Int. Cl.
*G01N 23/18*    (2018.01)
*G01N 23/20*    (2018.01)
(Continued)

(52) U.S. Cl.
CPC ........... *G01N 23/204* (2013.01); *G01N 23/09* (2013.01); *G01N 23/18* (2013.01);
(Continued)

(58) Field of Classification Search
CPC ...... G01N 23/09; G01N 23/18; G01N 23/204; G01N 2223/106; G01N 2223/3303;
(Continued)

(56) References Cited

U.S. PATENT DOCUMENTS

| | | |
|---|---|---|
| 4,850,002 A | 7/1989 | Harding et al. |
| 10,098,218 B2 | 10/2018 | Yamamoto et al. |

(Continued)

FOREIGN PATENT DOCUMENTS

| | | |
|---|---|---|
| JP | S6370153 A | 3/1988 |
| JP | H10-185843 A | 7/1998 |

(Continued)

OTHER PUBLICATIONS

Ikeda et al., "Nondestructive Observation Technique of Water and Voids in Slabs by a Small Neutron Source," (The Water Inside the Floor Slab with a Compact Neutron Source and Void Non-Destructive Observation Technology), Research Paper, 2016, Proceedings of 9th Symposium on Decks of Highway Bridge, pp. 93-98.
International Search Report and Written Opinion dated Jun. 9, 2020, in connection with International Patent Application No. PCT/JP2020/008172, filed Feb. 27, 2020, 10 pgs. (including translation).
(Continued)

*Primary Examiner* — Mark R Gaworecki
(74) *Attorney, Agent, or Firm* — Chiesa Shahinian & Giantomasi PC

(57) ABSTRACT

A non-destructive inspection system includes: a neutron emission unit 12 capable of emitting neutrons pulsed; a neutron detector capable of detecting the neutrons emitted
(Continued)

from the neutron emission unit and penetrating through an inspection object; a storage unit storing attenuation information indicating a relationship between a material of the inspection object and attenuation of the neutrons; and a calculation unit capable of calculating distance information indicating a position of a specific portion in the inspection object in accordance with time change information which is information on a change over time in an amount of the neutrons detected by the neutron detector. The calculation unit is capable of generating information related to an amount of the specific portion from information based on the amount of the neutrons according to the time change information, using the distance information and the attenuation information.

20 Claims, 14 Drawing Sheets

(51) Int. Cl.
*G01N 23/09* (2018.01)
*G01N 23/204* (2006.01)
(52) U.S. Cl.
CPC .................. *G01N 2223/106* (2013.01); *G01N 2223/3303* (2013.01); *G01N 2223/614* (2013.01); *G01N 2223/631* (2013.01); *G01N 2223/646* (2013.01)
(58) Field of Classification Search
CPC ....... G01N 2223/614; G01N 2223/631; G01N 2223/646
See application file for complete search history.

(56) References Cited

U.S. PATENT DOCUMENTS

| | | | |
|---|---|---|---|
| 10,241,061 B2 | 3/2019 | Otake et al. | |
| 2006/0285622 A1 | 12/2006 | Tsao et al. | |
| 2010/0246763 A1* | 9/2010 | Kang | G21B 1/19 378/57 |
| 2011/0284750 A1* | 11/2011 | Nakamura | G01T 3/06 250/362 |
| 2012/0046867 A1* | 2/2012 | Faber | G01T 1/1611 250/255 |
| 2013/0206985 A1 | 8/2013 | Turner et al. | |
| 2016/0282285 A1* | 9/2016 | Karlen | G01N 23/083 |
| 2017/0038316 A1* | 2/2017 | Belcher | G01N 23/203 |
| 2017/0223815 A1 | 8/2017 | Yamamoto et al. | |
| 2018/0259462 A1 | 9/2018 | Otake et al. | |

FOREIGN PATENT DOCUMENTS

| | | | | |
|---|---|---|---|---|
| JP | 2006-010356 A | 1/2006 | | |
| JP | 2008-180700 A | 8/2008 | | |
| JP | 2010-175362 A | 8/2010 | | |
| JP | 2013174587 A | 9/2013 | | |
| WO | WO-2006089097 A2 * | 8/2006 | ............. | G01T 3/00 |
| WO | WO-2009146211 A1 * | 12/2009 | ........... | G01V 5/0091 |
| WO | 2016035151 A1 | 3/2016 | | |
| WO | 2017043581 A1 | 3/2017 | | |

OTHER PUBLICATIONS

Notice of Reasons for Refusal dated Oct. 18, 2022 in connection with Japanese Patent Application No. 2019-034643, 6 pgs. (including translation).

* cited by examiner

NONDESTRUCTIVE TESTING SYSTEM AND NONDESTRUCTIVE TESTING METHOD

CROSS-REFERENCE TO RELATED APPLICATIONS

This application is a national stage of International Patent Application Serial No. PCT/JP2020/008172, filed Feb. 27, 2020, which claims priority to Japanese Patent Application Serial No. 2019-034643, filed Feb. 27, 2019, the disclosures of both are incorporated herein by reference in their entirety.

TECHNICAL FIELD

The present disclosure relates to a non-destructive inspection system and a non-destructive inspection method of inspecting an inspection object using a neutron beam.

BACKGROUND ART

In recent years, it has been desired to appropriately maintain, repair, or renew aging infrastructure (hereinafter, referred to as infrastructure constructions) such as roads, bridges, tunnels, and building structures.

To inspect such an infrastructure construction, non-destructive inspection is performed using radiation, such as X-rays, penetrating an object. This non-destructive inspection allows an internal structure of an inspection object to be analyzed without destroying the inspection object.

In particular, in recent years, apparatuses for non-destructive inspection using neutrons, which are more penetrating than X-rays, have also been studied. For example, Patent Document 1 discloses a configuration in which a portable neutron generation source is mounted on a vehicle, and non-destructive inspection of the inside of a bridge is performed using the neutrons while the vehicle travels on the bridge.

CITATION LIST

Patent Documents

Patent Document 1: International Patent Publication No. WO2016/035151
Patent Document 2: Japanese Unexamined Patent Publication No. 2008-180700

SUMMARY OF THE INVENTION

Technical Problem

The non-destructive inspection using neutrons of Patent Document 1 allows inspection of the presence of a defect at a position facing the neutron detector. However, specifying at which position in the depth direction the defect exists and the decree of the defect has been difficult.

To address the problem, Patent Document 2 discloses a detection method including: calculating distribution information on a thermal neutron detection rate with reference to the occurrence time of fast neutrons, and determining the position and amount of water, if the water is contained in the inspection object, using this distribution information. In the method according to the invention, the thermal neutron detection rate corresponding to the amount of water is measured in advance. The amount of water is measured based on the thermal neutron detection rate corresponding to the amount of water stored in the memory, and the detected thermal neutrons.

However, the method according to Patent Document 2 fails to take into consideration the influence of the attenuation due to a penetration distance until the detector detects the thermal neutrons generated in the water. It is thus difficult to accurately measure the amounts of water in deep and shallow portions of a bridge, for example.

The present disclosure was made to solve such problems. It is an objective to provide a non-destructive inspection system and non-destructive inspection method capable of accurately detecting the amount of a specific portion of an inspection object based on the position information on the specific portion in non-destructive inspection using neutrons for the inspection object.

Solution to the Problem

In order to achieve the objective, a non-destructive inspection system according to the present disclosure includes: a neutron emission unit capable of emitting neutrons pulsed; a neutron detector capable of detecting the neutrons emitted from the neutron emission unit and penetrating through an inspection object; a storage unit storing attenuation information indicating a relationship between a material of the inspection object and attenuation of the neutrons; and a calculation unit capable of calculating distance information indicating a position of a specific portion in the inspection object in accordance with time change information which is information on a change over time in an amount of the neutrons detected by the neutron detector, the calculation unit being capable of generating information related to an amount of the specific portion from information based on the amount of the neutrons according to the time change information, using the distance information and the attenuation information.

In the non-destructive inspection system, the calculation unit may calculate the distance information from time information on a peak of the time change information.

In the non-destructive inspection system, the calculation unit may calculate the amount of the specific portion from information based on the amount of the neutrons at the peak of the time change information.

In the non-destructive inspection system, the calculation unit may calculate the amount of the specific portion from an integrated value based on a time course according to the time change information.

In the non-destructive inspection system, the calculation unit may calculate an extraction time for extracting information on the amount of the neutrons from the time change information on the amount of the neutrons detected by the neutron detector based on the distance information, and may calculate the amount of the specific portion in accordance with the amount of the neutrons according to the time change information at the extraction time.

In the non-destructive inspection system, the calculation unit may generate information related to composition of the specific portion from the time change information on the amount of the neutrons detected by the neutron detector.

In the non-destructive inspection system, the neutron detector may be capable of detecting neutrons back-scattered inside the inspection object.

In the non-destructive inspection system, the neutron detector may be capable of detecting neutrons that have penetrated through the inspection object.

In order to achieve the objective, a non-destructive inspection system according to the present disclosure includes: a neutron emission unit capable of emitting neutrons; a neutron detector capable of detecting the neutrons emitted from the neutron emission unit and penetrating through an inspection object; a collimator positioned between the inspection object and the neutron detector and arranged so that the neutrons penetrating through the inspection object enter the neutron detector with predetermined directivity; a storage unit storing attenuation information indicating a relationship between a material of the inspection object and attenuation of the neutrons; and a calculation unit configured to perform calculation based on a result detected by the neutron detector, the neutron emission unit being configured to emit the neutrons such that a center axis of neutron emission intersects a center axis direction of the collimator; and the calculation unit being capable of calculating distance information indicating a position of a specific portion in the center axis direction of the collimator from position information on the neutron detector and/or position information on the neutron emission unit, information related to an angle at which the center axis of the neutron emission intersects the center axis direction of the collimator, and an amount of the neutrons detected by the neutron detector, and being capable of generating information related to an amount of the specific portion based on the amount of the neutrons according to the time change information, using the distance information and the attenuation information.

In the non-destructive inspection system, the neutron emission unit may be configured to emit the neutrons such that the center axis of the neutron emission intersects the center axis direction of the collimator at an angle of 10 degrees to 80 degrees.

A non-destructive inspection method uses: a neutron emission unit capable of emitting neutrons pulsed; a neutron detector capable of detecting the neutrons emitted from the neutron emission unit and penetrating through an inspection object; a storage unit storing attenuation information indicating a relationship between a material of the inspection object and attenuation of the neutrons; and a calculation unit capable of calculating distance information indicating a position of a specific portion in the inspection object in accordance with time change information which is information on a change over time in an amount of the neutrons detected by the neutron detector. The method includes: emitting the neutrons, by the neutron emission unit, toward the inspection object; detecting the neutrons by the neutron detector; and generating, by the calculation unit, information related to an amount of the specific portion based on the amount of the neutrons according to the time change information, using the distance information and the attenuation information.

Advantages of the Invention

The present disclosure using the above-described means allows accurate detection of the amount of the specific portion of the inspection object based on the position information on the specific portion in the non-destructive inspection using the neutrons for the inspection object.

DESCRIPTION OF EMBODIMENTS

Embodiments of the present disclosure will be described in detail with reference to the drawings.

First Embodiment

A first embodiment of the present disclosure will be described below.

<Overall Configuration>

Figure 1:
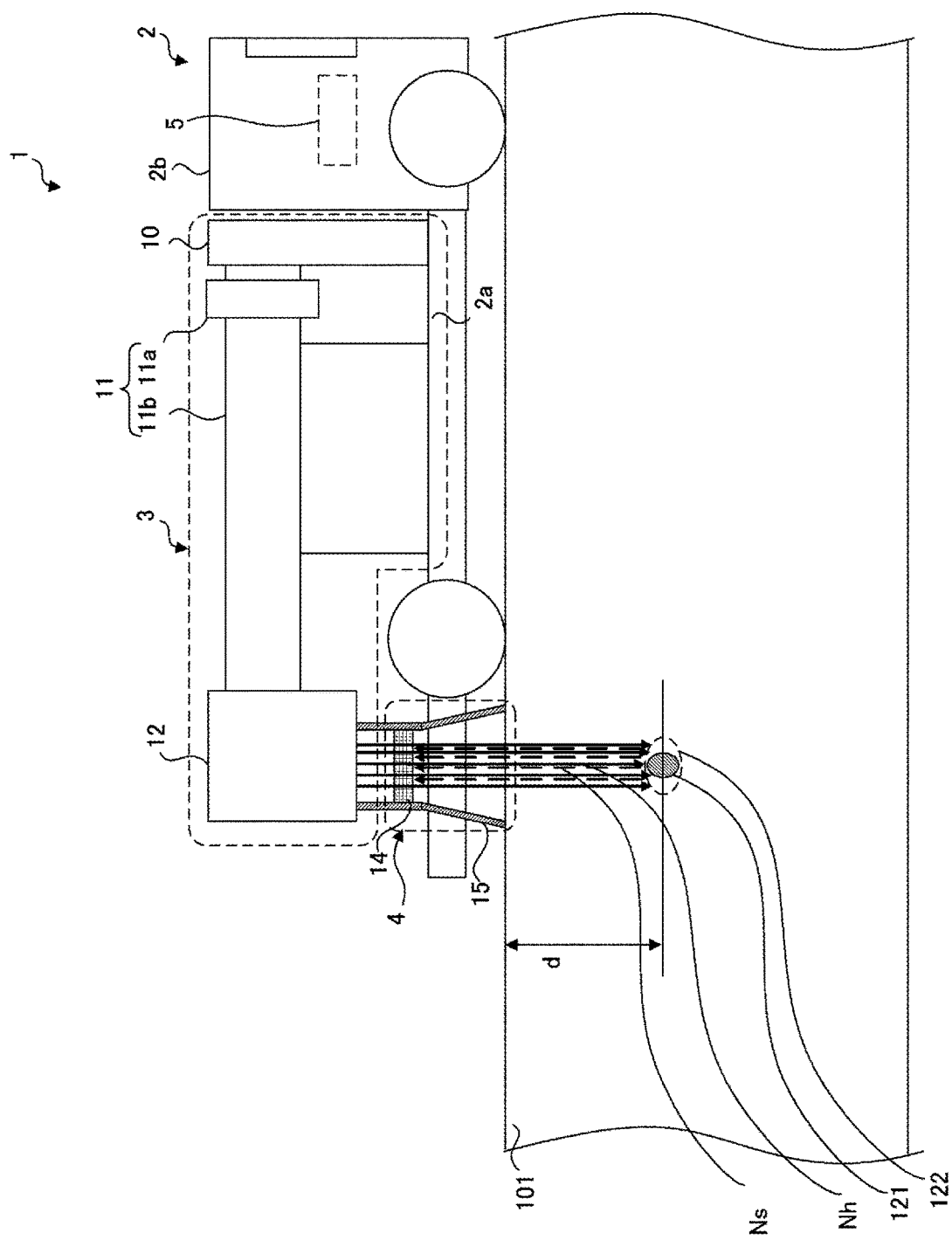
FIG. 1 is a schematic configuration diagram illustrating a non-destructive inspection system according to a first embodiment of the present disclosure.

FIG. 1 illustrates a schematic configuration of a non-destructive inspection system 1 according to a first embodiment of the present disclosure. The configuration of the non-destructive inspection system 1 according to this embodiment will now be described with reference to this figure.

As shown in FIG. 1, in the non-destructive inspection system 1 according to this present embodiment, a neutron irradiation source system 3, a detection system 4, and a control unit 5 are mounted on a vehicle 2 that is a moving body. The vehicle 2 is, for example, a truck, which includes a platform 2a on which the neutron radiation source system 3 and the detection system 4 are mounted, and a driver's seat 2b on which the control unit 5 is mounted. In the present embodiment, the vehicle 2 travels on a bridge 101 mainly made of concrete, and performs non-destructive inspection for the bridge 101 as an inspection object.

The neutron radiation source system 3 includes a power supply 10, a linear accelerator 11 that emits a proton beam P that is a charged particle beam, and a neutron emission unit 12. The detection system 4 includes a neutron detector 14 that detects a neutron beam that has penetrated through the inspection object, and a shielding tube 15 for preventing neutrons from spreading to the outside.

Specifically, the power supply 10 is a generator that supplies electric power to units. In one preferred embodiment, the generator of the power supply 10 has a power generation performance to enable generation of at least protons that are charged particles, generates small voltage fluctuations, and is resistant to harmonic current. The power supply 10 may include a battery capable of storing electric power generated by the generator.

The linear accelerator 11 has an ion source 11a that generates protons and is connected to the neutron emission unit 12 via a cylindrical accelerator 11b. The accelerator 11b accelerates protons generated by the ion source 11a and emits the protons, as the proton beam P, to the neutron emission unit 12. By intermittently generating the protons, the ion source 11a emits temporally discrete, pulsed neutrons through the neutron emission unit 12.

The neutron emission unit 12 includes a target section (not shown) and an emission collimator (not shown). The target section generates neutrons by colliding with protons, and is formed to contain, for example, beryllium. To the target section, an emission collimator is connected. The emission collimator selects neutrons in a predetermined direction among neutrons generated at the target section. With this emission collimator, the directivity of the fast neutrons Nh to be emitted can be enhanced. The path from the linear accelerator 11 to the target section has a structure capable of maintaining high vacuum not to prevent the charged particles from flying.

The neutron detector 14 is formed in the shape of a rectangular plate, and is disposed below the neutron emission unit 12. The neutron detector 14 according to this embodiment detects thermal neutrons Ns back-scattered in the bridge 101, out of the neutrons generated by the neutron emission unit 12. In FIG. 1, the fast neutrons Nh emitted from the neutron emission unit 12 are indicated by a solid arrow, and the thermal neutrons Ns are indicated by a dotted arrow.

In FIG. 1, the non-destructive inspection system 1 is placed on a bridge 101 which is an inspection object. The figure also shows that there is a specific portion 121 under the neutron emission unit 12 at a distance d from a paved surface of the bridge 101. At the specific portion, water is pooling in a crack of the concrete of the bridge 101. The fast neutrons Nh emitted from the neutron emission unit 12 and having an energy of 1 MeV progresses in the concrete of the bridge 101 and are scattered or attenuated by the constituent elements thereof. The atomic nucleus of hydrogen which is an element of water has a mass similar to that of neutrons. The energy loss of the neutrons is thus larger at the time of elastic scattering. Being incident on the water, the fast neutrons Nh are scattered as thermal neutrons. At a specific portion 122 indicated by a dotted line in FIG. 1, there is a larger crack with a larger amount of pooling water than at the specific portion 121.

Figure 2:
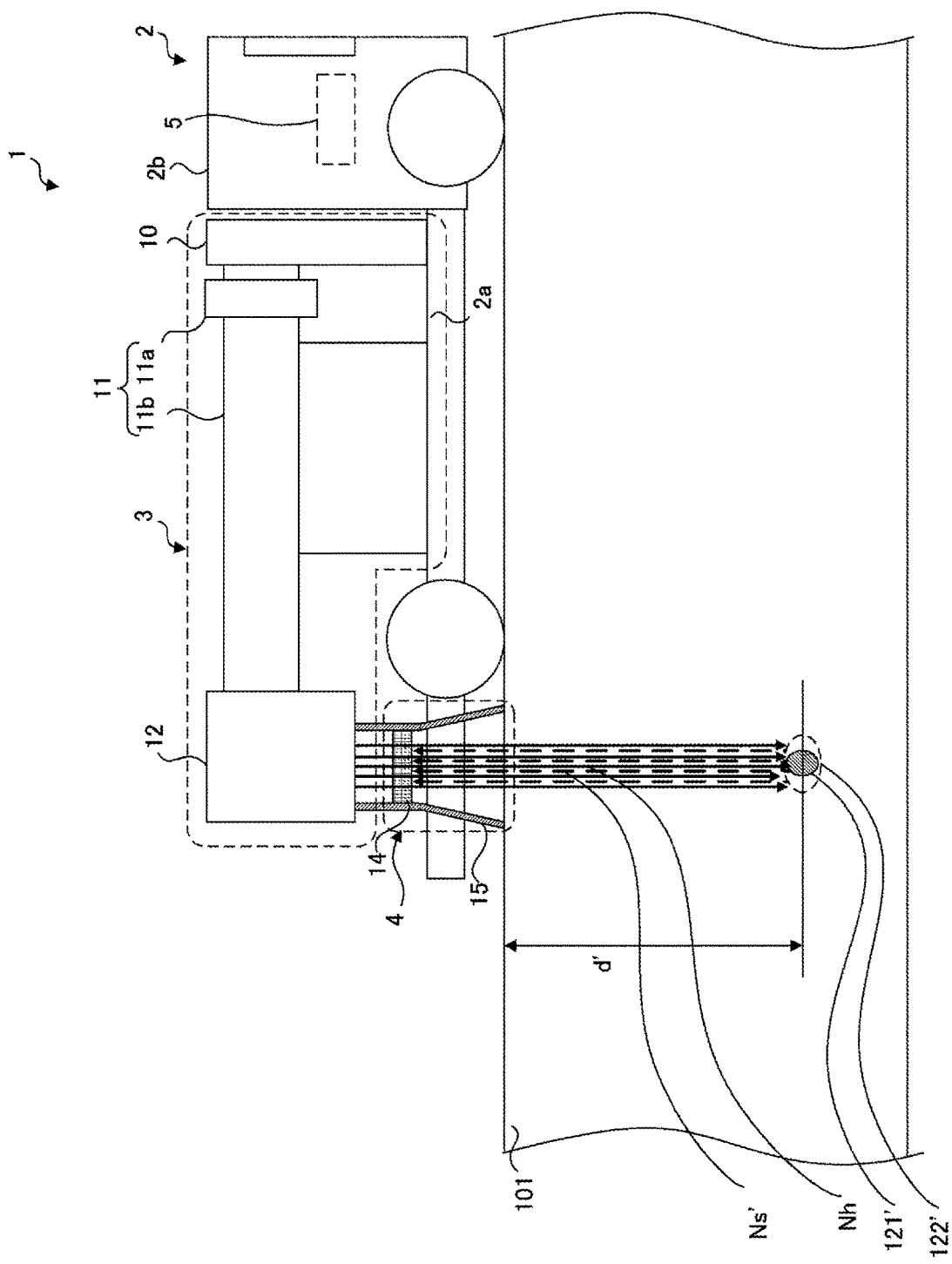
FIG. 2 is a schematic configuration diagram illustrating the non-destructive inspection system, together with a specific portion in a position different from that in FIG. 1.

FIG. 2 shows that there is a specific portion 121' corresponding to the specific portion 121 in FIG. 1 but located at a distance d', which is longer than the distance d, from the paved surface of the bridge 101. The scattered thermal neutrons Ns' reach the paved surface at the shortest distance d' from the specific portion 121' and are detected by the neutron detector 14. At a specific portion 122' indicated by a dotted line in FIG. 2, there is a larger crack with a larger amount of pooling water than at the specific portion 121'. The amount is the same as at the specific portion 122.

<Detection Data>

Figure 3:
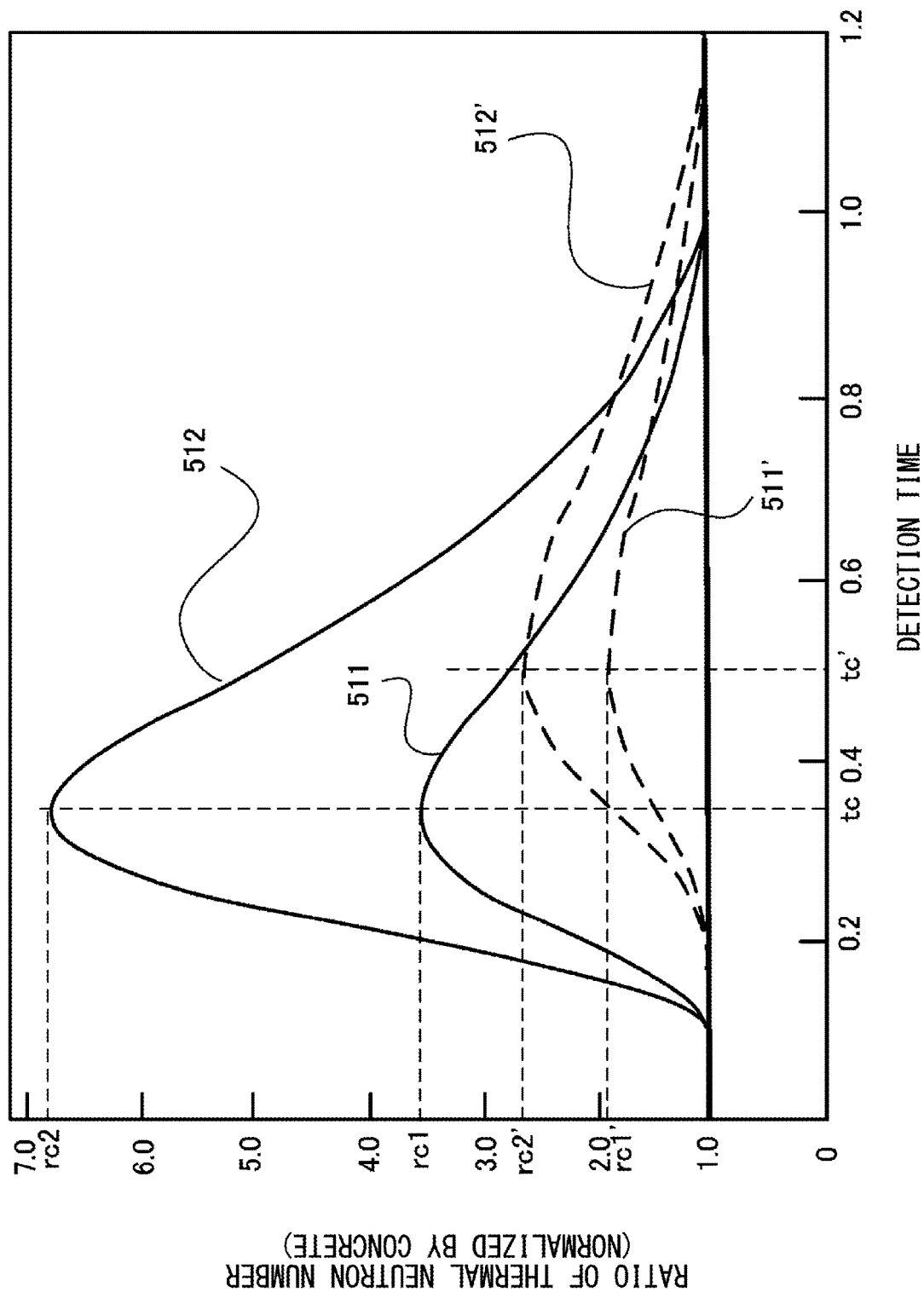
FIG. 3 shows data on the change over time in the ratio of the amount of thermal neutrons scattered by different amounts of water in positions at different depths in an inspection object.

FIG. 3 shows data on the change over time in the ratio of the amount of thermal neutrons with respect to water in different positions in an inspection object, as measured by the non-destructive inspection system 1. In FIG. 3, the horizontal axis represents the time from the point at which the neutron emission unit 12 emits pulsed fast neutrons to the inspection object. The horizontal axis represents no absolute time but the time normalized by a predetermined value. The vertical axis represents the number of thermal neutrons detected by the neutron detector 14. The number of detections on the vertical axis is normalized using a standard state 1 where there is neither water nor cavity in the inspection object, that is, the inspection object has no specific portion but is filled with concrete.

In FIG. 3, a line 511 represents the change over time in the amount of thermal neutrons detected by the neutron detector 14 when the specific portion 121 at the depth d in FIG. 1 is irradiated with fast neutrons Nh. On the other hand, a line 511' represents the change over time in the amount of thermal neutrons detected by the neutron detector 14 when the specific portion 121' at the depth d' in FIG. 2 is irradiated with fast neutrons Nh. Similarly, a line 512 represents the change over time in the amount of thermal neutrons detected by the neutron detector 14 when the specific portion 122 at the depth d in FIG. 1 is irradiated with fast neutrons Nh. On the other hand, a line 512' represents the change over time in the amount of thermal neutrons detected by the neutron detector 14 when the specific portion 122' at the depth d' in FIG. 2 is irradiated with fast neutrons Nh.

The velocity of the thermal neutrons is about 2200 [m/s], which is extremely slow compared to, for example, the velocity of fast neutrons at 1.0 [MeV], which is $1.4 \times 10^7$ [m/s]. Therefore, the time difference between the emission timing of the fast neutrons and the detection timing of the thermal neutrons depends on the penetration distance of the thermal neutrons. The line 511 has a peak of the ratio of the number of thermal neutrons at the detection time tc. The line 511' has a peak at tc' with a delay from tc. The peak tc of the line 511 is determined by the time when the thermal neutrons substantially pass through the distance d, while the peak tc' of line 511' is determined by the time when the thermal neutrons pass through the distance d'. That is, the position of the peak on the horizontal axis corresponds to the depth of the specific portion. This allows the non-destructive inspection system 1 to estimate the depth of (i.e., the distance information on) the specific portion from the position of the peak.

Next, the height of the peak will be described. As described above, in FIG. 3, the vertical axis also represents the value obtained by normalizing the amount of thermal neutrons detected by the neutron detector 14. That is, the larger the amount of water is at the same depth, the larger the amount of thermal neutrons is scattered by the water and detected. Here, the line 511 as the result of detecting the thermal neutrons scattered by the specific portion 121 has a peak height of rc1. The line 512 as the result of detecting the thermal neutrons scattered by the specific portion 122 with a larger amount of water than the specific portion 121 has a peak height of rc2 which is higher than rc1.

The line 511' as the result of detecting the thermal neutrons scattered by the specific portion 121' with the same amount of water as in the specific portion 121 has a peak height of rc1' which is lower than rc1.

Here, attenuation of fast neutrons and thermal neutrons will be described. Fast neutrons can penetrate the air almost without attenuation. However, in a case of penetration through an object such as concrete, attenuation occurs due to collision with constituent elements. Thermal neutrons attenuate in the air and in objects. Where the attenuation rate is β, the neutron amount $CN_X$ after attenuation with respect to an incident amount $CN_0$ can be expressed by the following mathematical 1 in relation to a penetration distance X. Note that the attenuation rate β is a value determined by the relationship between penetrating neutrons and a penetrated material.

$$CN_X = F(\beta, X) \cdot CN_0 \quad \text{(Mathematical 1)}$$

As the function F, for example, an exponential function can be used.

The distances of the specific portions 121 and 121' have a relationship of d<d'. The fast neutrons reaching the specific portion d 121' thus attenuate more than the fast neutrons reaching the specific portion 121. In addition, the thermal neutrons scattered by the specific portion 121' attenuate more than the thermal neutrons scattered by the specific portion 121 by the penetration distance. The amount of unattenuated thermal neutrons may be estimated from the relationship between the distances d and d' estimated from the positions of the peaks and the attenuation rate using Mathematical 1. Accordingly, it can be calculated that the specific portions 121 and 121' have the same amount of water, from the relationship between the distance d and the peak height rc1 and the relationship between the distance d' and the peak height rc1'.

The non-destructive inspection system 1 estimates the amount of the specific portion by using the data on the known amount and depth of the specific portion in advance and associating such data with detection data.

<Control Unit Configuration>

Figure 4:
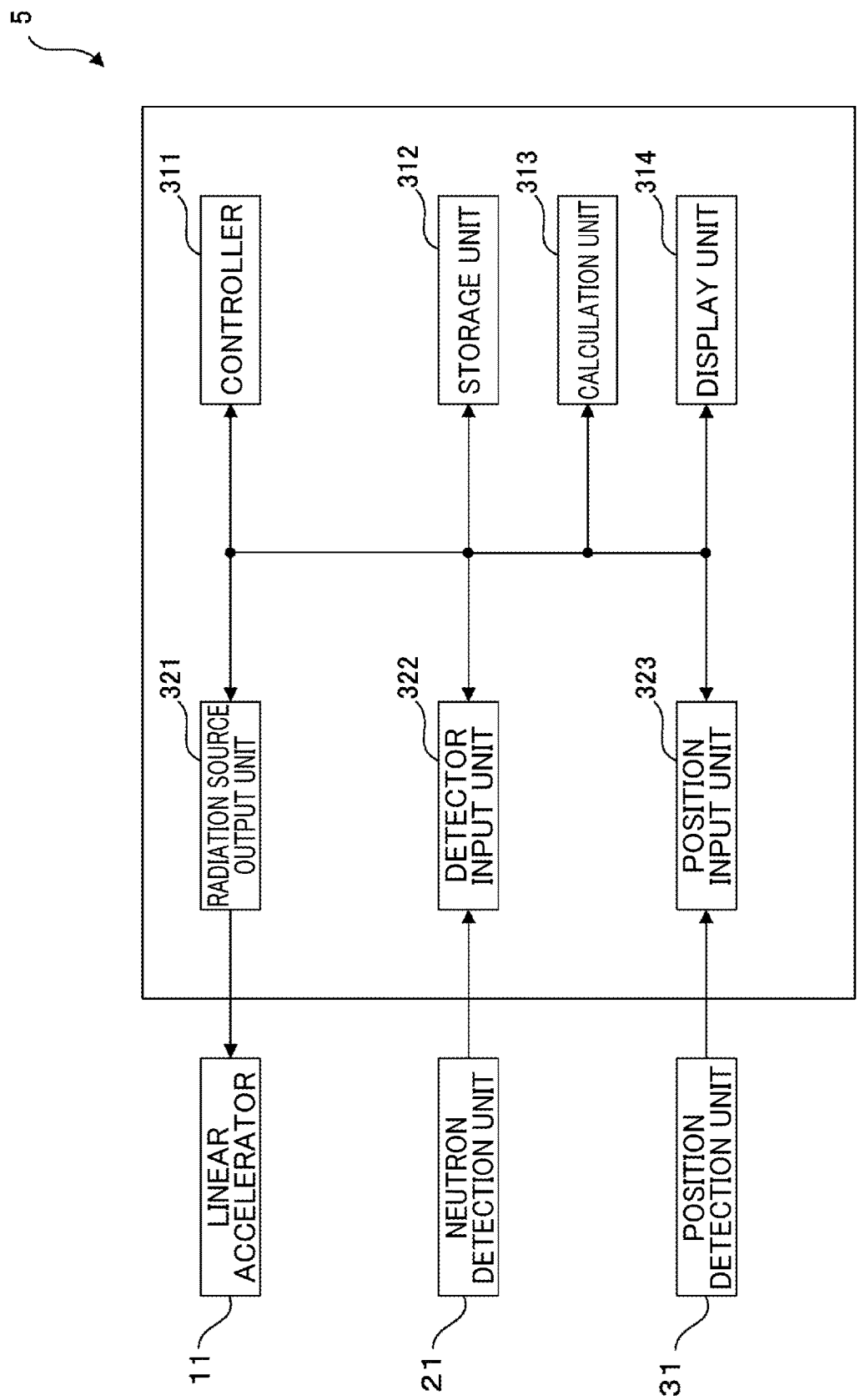
FIG. 4 is a block diagram illustrating a control unit of the present disclosure.

Next, a configuration of the control unit will be described. FIG. 4 is a block diagram illustrating the configuration of the control unit 5. The control unit 5 is a unit including a controller 311, a storage unit 312, a calculation unit 313, a display unit 314, a radiation source output unit 321, a detector input unit 322, and a position input unit 323, and is configured as a dedicated computer, a general-purpose computer in which software is installed, or the like.

The controller 311 controls the entire control unit 5. The storage unit 312 stores information on the result of detecting the amount of the neutrons by the neutron detector 14. In addition, the storage unit stores data of the attenuation rate for each material. The storage unit 312 also stores reference data on the known amount and depth of the specific portion.

The calculation unit 313 processes the detection result and generates the information on the change in the amount of neutrons over time (hereinafter also referred to as the "time change information"). The calculation unit 313 also performs calculation for detecting a peak for the time change information. In addition, the calculation unit 313 performs calculation for estimating the position of the specific portion from the detection time for the peak. The calculation unit 313 calculates the extraction time for extracting information on the amount of the neutrons from the time change information in accordance with peak detection time. In addition, the calculation unit 313 performs the calculation for estimating the amount of the specific portion by correcting the attenuation rate according to the time change information, the calculated extraction time, and the peak position.

The display unit 314 is a device that displays the information on the calculated position, depth, and amount of the specific portion so as to be visible to the user. The radiation source output unit 321 controls the linear accelerator 11 connected. For example, the linear accelerator 11 can be controlled so that the neutron emission unit 12 emits temporally discrete, pulsed neutrons. Further, the detector input unit 322 receives the outputs from the neutron detector 14 connected. The position input unit 323 receives the position of the non-destructive inspection system 1 from a position detection unit 31. The position detection unit 31 may be, for example, a GPS, a camera, or other measurement means. Accordingly, at which position of the inspection object the non-destructive inspection system 1 measures is known.

<Flow of Processing>

Figure 5:
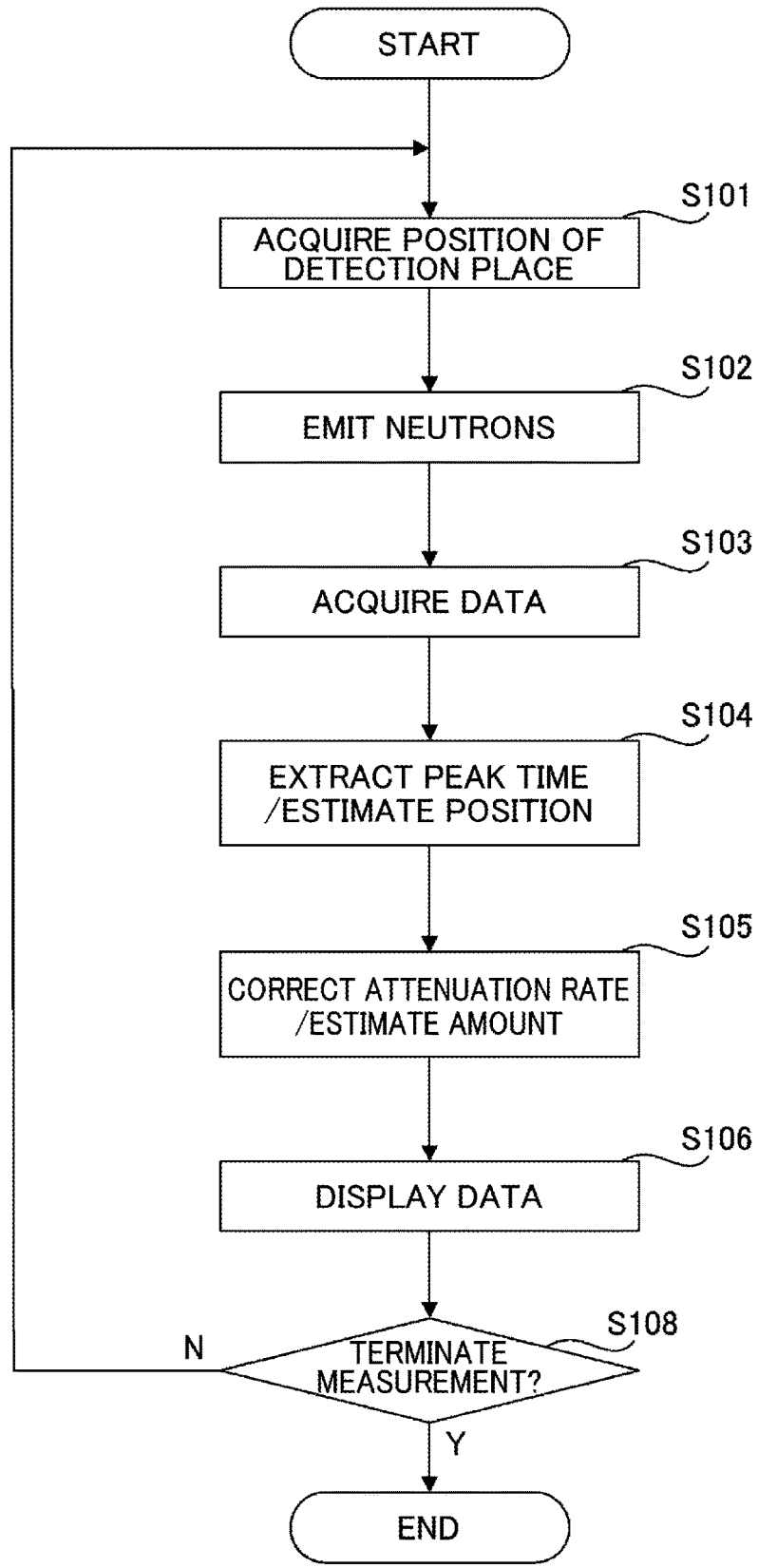
FIG. 5 is a flowchart illustrating an operation of the non-destructive inspection system according to the first embodiment of the present disclosure.

Next, the operation of the non-destructive inspection system 1 according to the first embodiment will be described with reference to the flowchart shown in FIG. 5.

In step S101, the position input unit 323 acquires a position of a detection place from the position information on the non-destructive inspection system 1 and on the inspection object. The position of the detection place is, for example, on a plane that is a surface of a bridge.

In step S102, the radiation source output unit 321 controls the linear accelerator 11 to emit pulsed neutrons from the neutron emission unit 12.

In step S103, the detector input unit 322 acquires data on the amount of the neutrons detected by the neutron detector 14, adds time information to the data, and stores the data as time change information on the amount of neutrons in the storage unit 312.

In step S104, the calculation unit 313 performs calculation for detecting a peak for the time change information. In addition, the calculation unit 313 performs calculation for estimating the position of the specific portion from the peak time.

In step S105, the calculation unit 313 corrects the attenuation rate of the peak height according to the time change information using the penetration distance of the thermal neutrons in the estimated specific portion. In addition, the calculation unit 313 performs calculation for estimating the amount of the specific portion from the corrected peak height.

In step S106, the display unit 314 displays the position or amount of the estimated specific portion calculated by the calculation unit 313 so as to be visible to the user.

In step S107, the controller 311 determines whether to terminate the measurement in response to a request from the user. The process is terminated if it is determined to terminate the measurement (Y). If it is not determined to terminate the measurement (N), the process returns to step S101.

Figure 6:
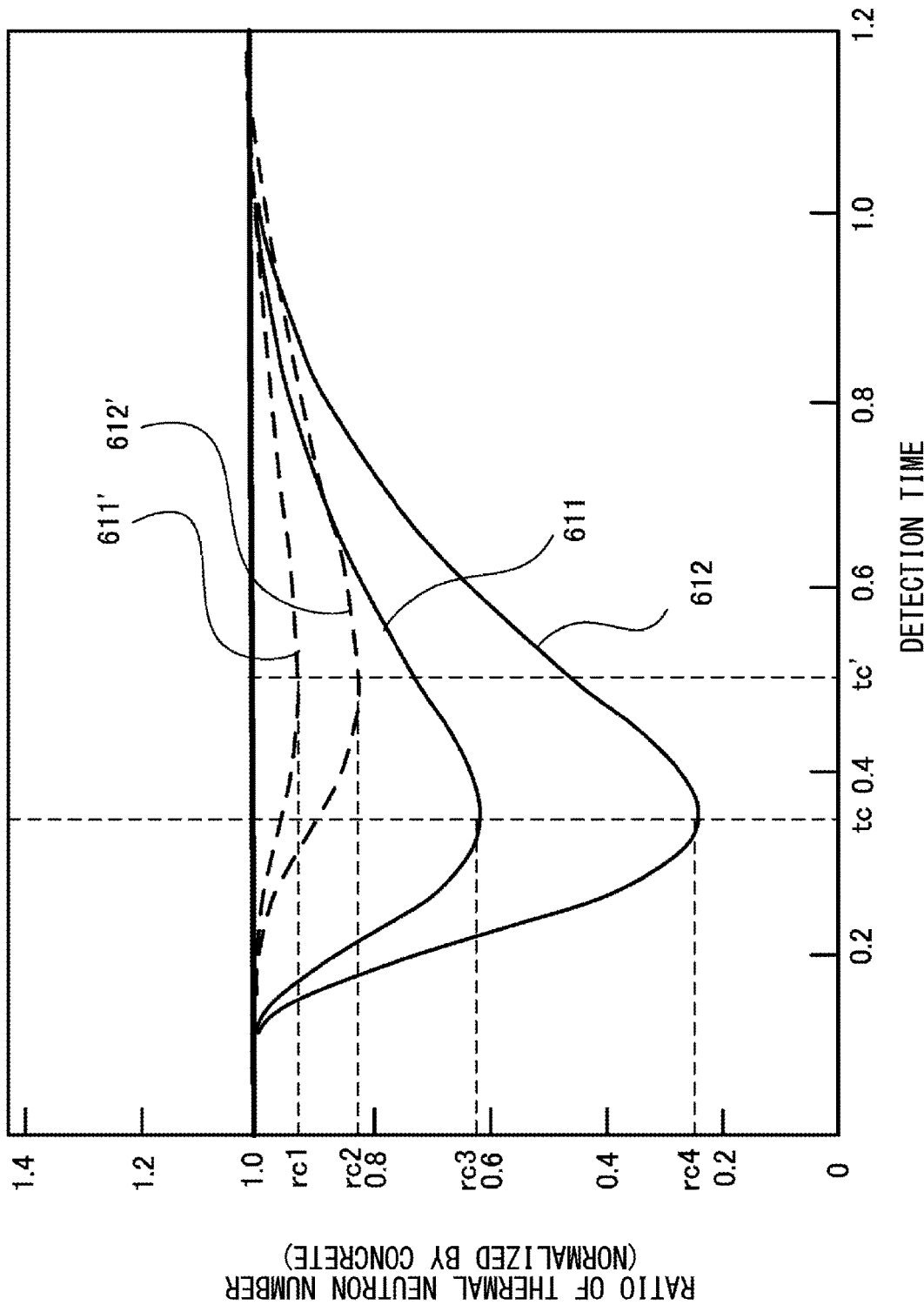
FIG. 6 shows data on the change over time in the ratio of the amount of thermal neutrons scattered by different amounts of cavities in positions at different depths in an inspection object.

An example has been described above where the specific portion is a water pool. If the specific portion is a cavity, the curve has the peak at the bottom with reference to 1 on the vertical axis as shown in FIG. 6. As in the case of water, the position of the cavity in the depth direction can be detected from the detection time of the peak position. The amount of cavity can be estimated from the peak height. In this manner, depending on whether the curve indicating the time change information on the amount of the detected neutrons faces upward or downward, whether the specific portion is a water pool or a cavity, that is, the composition of the specific portion can be estimated.

As described above, the pulsed fast neutrons are emitted to the inspection object. The distance (i.e., position) of the specific portion is estimated based on the peak position according to the time change information on the detected thermal neutrons. The amount of the water or cavity in the specific portion is estimated based on the peak height according to the time change information using the distance information and the attenuation information. As a result, the information is generated.

Figure 7:
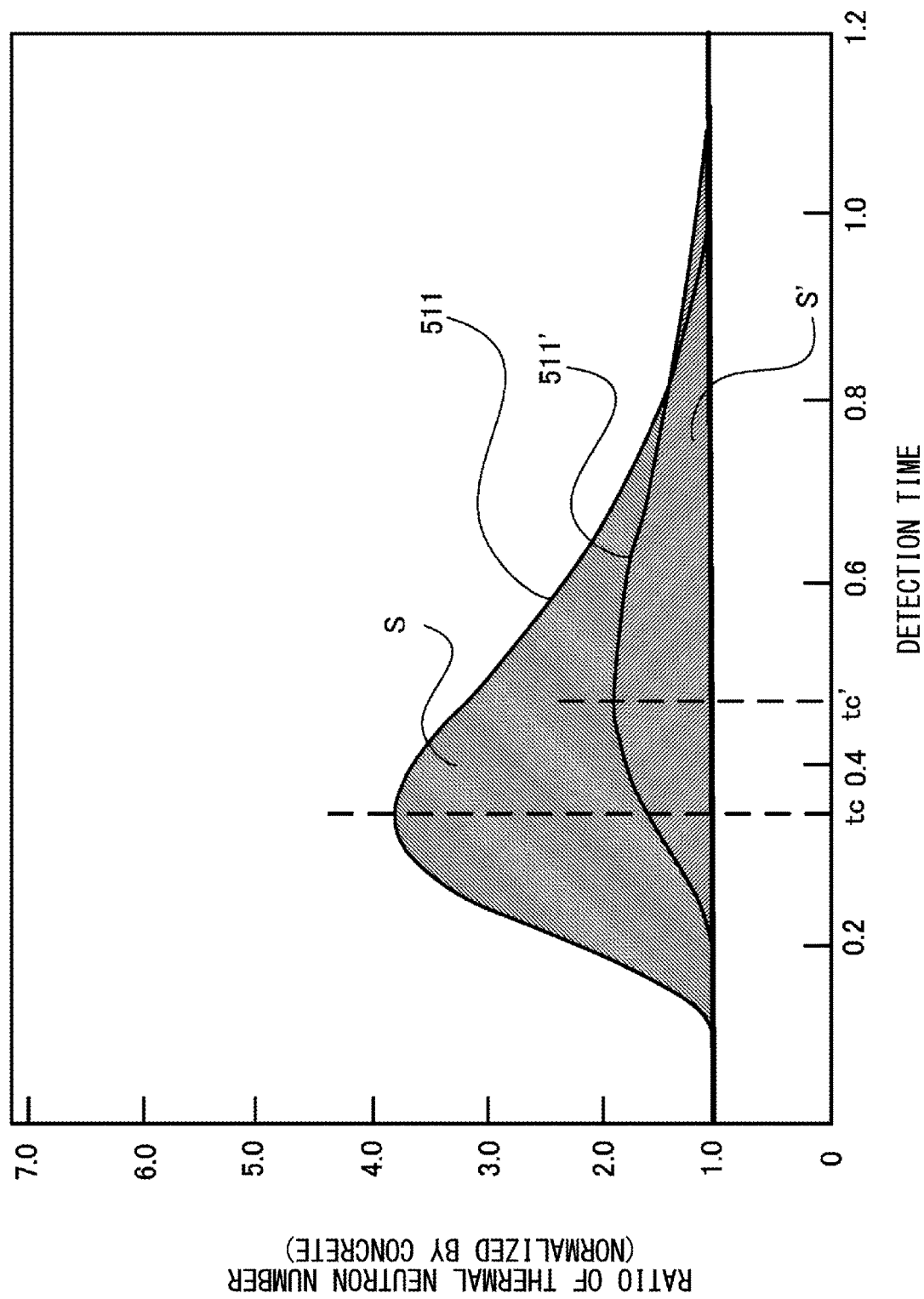
FIG. 7 illustrates an integral domain of the change over time in the ratio of the amount of thermal neutrons scattered by different amounts of water in positions at different depths in an inspection object.

As the amount of thermal neutrons, an integrated value of the area formed by the curve shown in FIG. 7 may be used instead of the peak height. The area S between the line 511 and the reference value is obtained by integrating the thermal neutrons scattered by the specific portion 121, that is, is the value corresponding to the amount of the specific portion. Similarly, the area S' between the line 511' and the reference value is obtained by integrating the thermal neutrons scattered by the specific portion 121'. The specific portions 121 and 121' have the same amount but different depth d and d' greater than d, respectively. The thermal neutrons scattered by the specific portion 121 at the depth d attenuate at the distance d. On the other hand, the thermal neutrons scattered by the specific portion 121' at the depth d' attenuate at the distance d'. The amounts of the specific portions can thus be estimated by correcting the amounts of attenuation of the areas S and S'.

Figure 8:
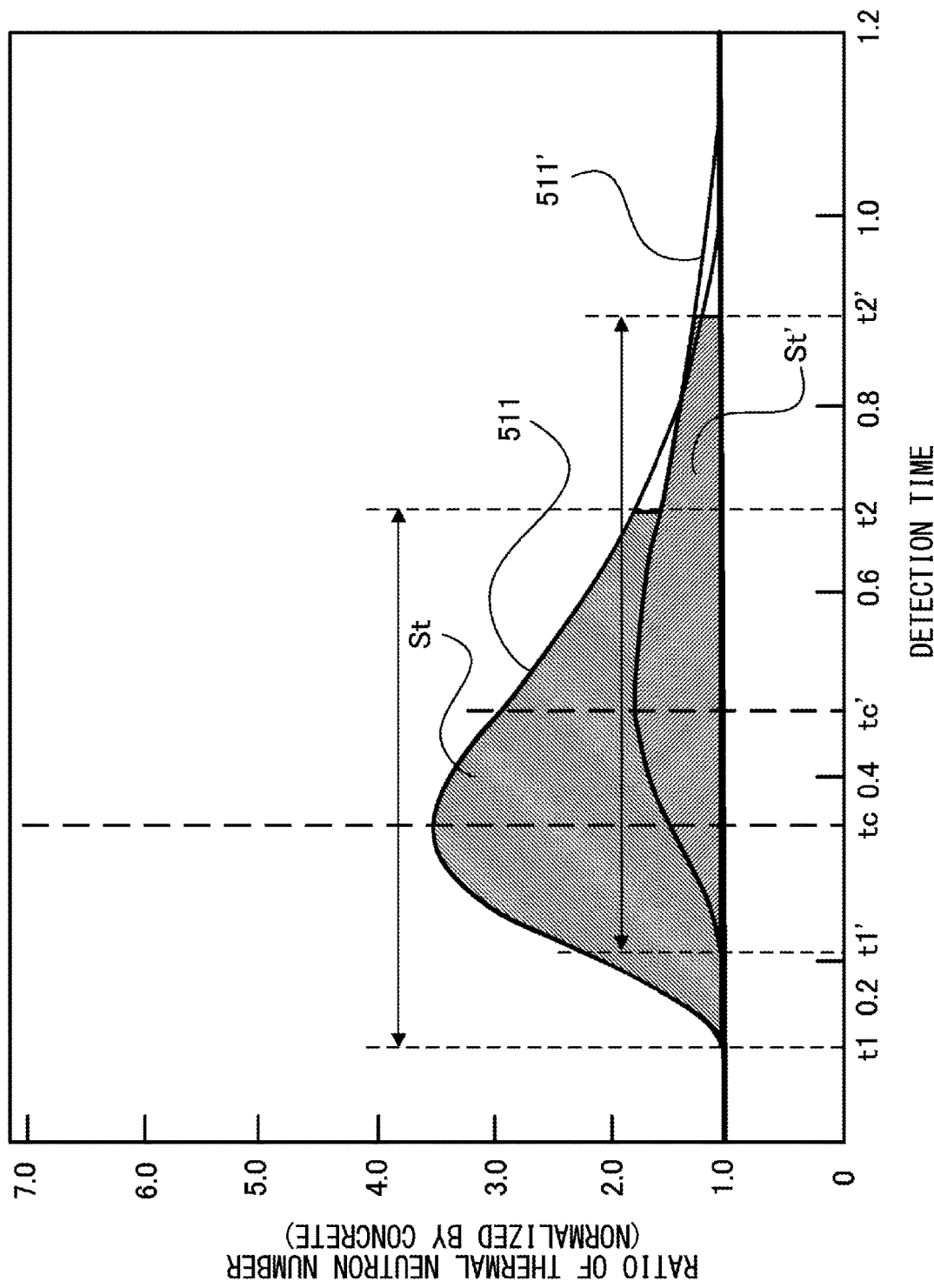
FIG. 8 illustrates an integral domain of the change over time in the ratio of the amount of thermal neutrons scattered by different amounts of water in positions at different depths in an inspection object, with detection times divided.

The time range for integration may vary depending on the distance information on the specific portion. In FIG. 1, the thermal neutrons Ns pass through the shortest distance d and are detected by the neutron detector 14. In addition, some thermal neutrons are further scattered repeatedly in the concrete, pass through a distance longer than the distance d, reach the paved surface, and are detected by the neutron detector 14. Those neutrons are detected with a delay. The longer the distance, the longer the delay. The curve of the line 511' is broader than the curve of the line 511. The thermal neutrons detected with a delay from the peak are repeatedly scattered. The number of such neutrons may vary depending not only on the amount of water but also on the surrounding environment. If a longer time is taken for the detection and the integrated value is calculated, the amount of water may be calculated differently depending on the thermal neutrons detected with the delay. To address the problem, a stable amount of water can be measured by setting the time for integration for extracting the amount of neutrons with respect to the peak, and integrating the amount of neutrons within the time. In FIG. 8, in the line 511, tc is the peak and the period from t1 to t2 is set as the extraction time. St is the integrated value during the period. In the line 511', tc' is the peak and the period from t1' to t2' is set as the extraction time. St' is the integrated value during the period. By limiting the range for the integration, the amount of the specific portion is accurately estimated, excluding the influence of the surrounding environment.

Figure 9:
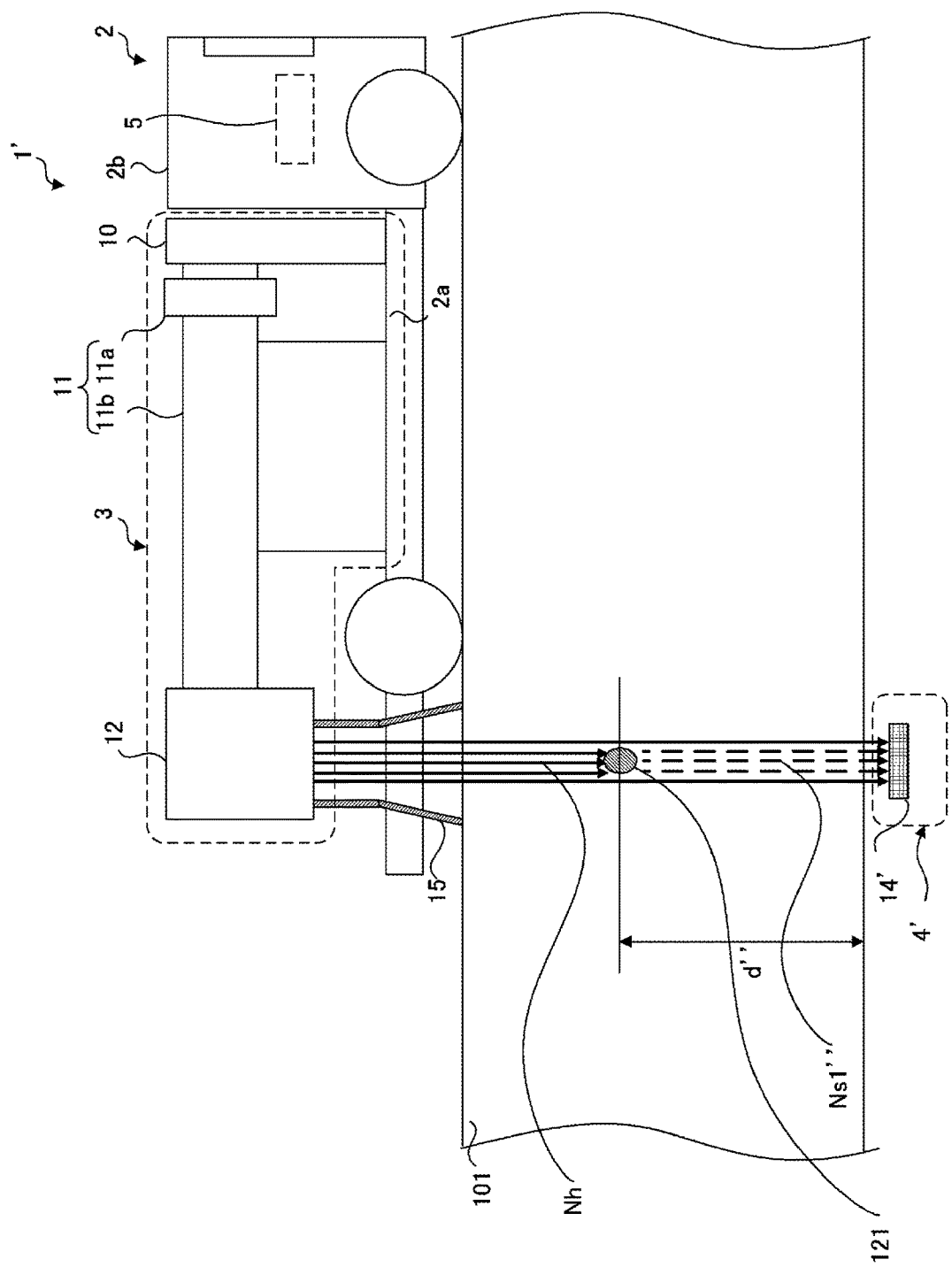
FIG. 9 is a schematic configuration diagram illustrating a non-destructive inspection system according to a variation of the first embodiment of the present disclosure.

In the first embodiment, the neutron emission unit 12 and the neutron detector 14 detect the thermal neutrons scattered in the same direction, that is, back-scattered with respect to the inspection object. However, the present disclosure is not limited thereto. In the non-destructive inspection system 1' shown in FIG. 9, the neutron detector 14 ' constituting the detection system 4' may sandwich the inspection object, together with the neutron emission unit 12, and detect the thermal neutrons Ns 1" obtained after penetrating the inspection object. At this time, the position information is calculated based on the distance d" from the specific portion 121 to the surface opposite to the paved surface to estimate the amount of the specific portion.

Second Embodiment

Figure 10:
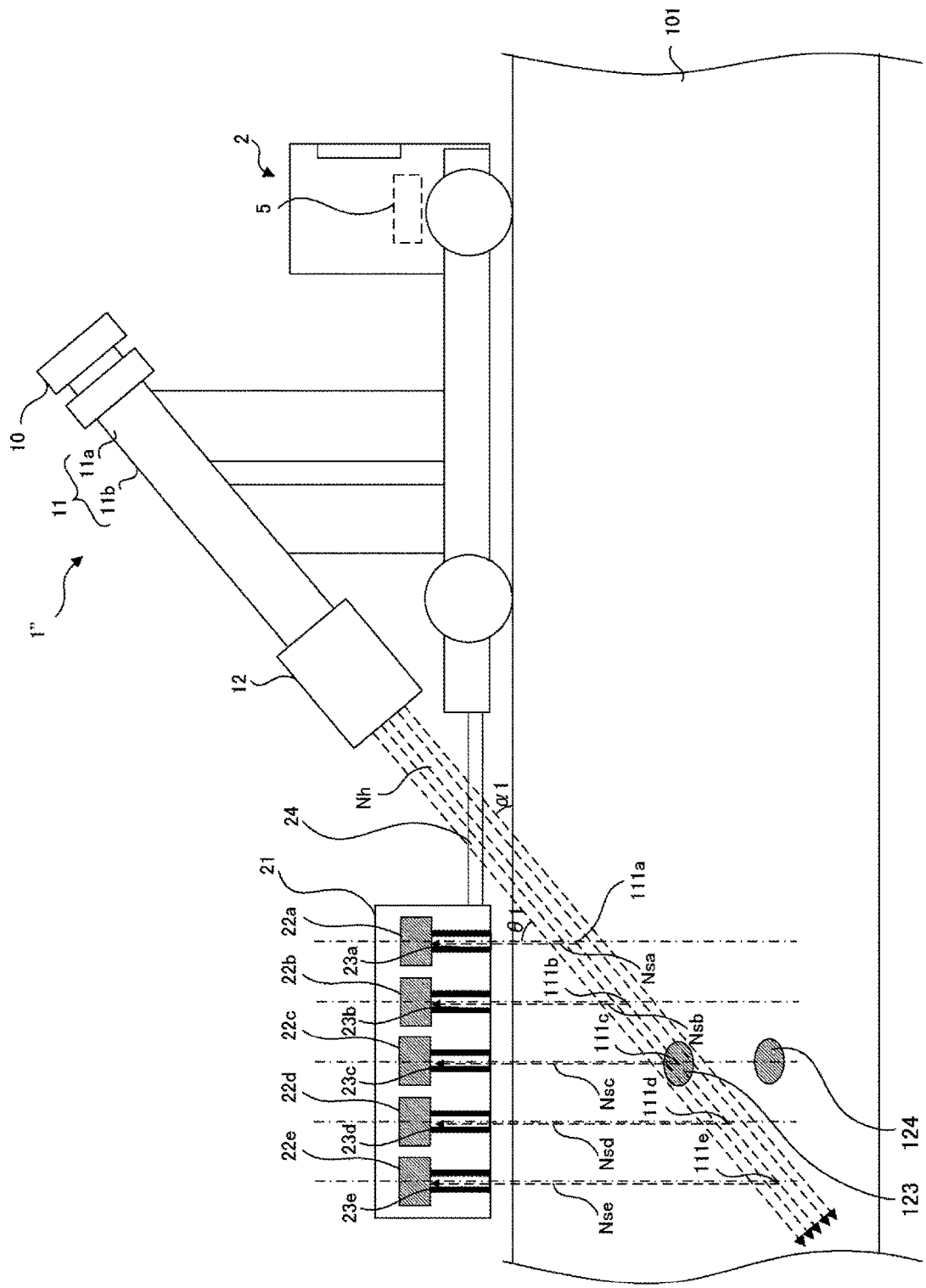
FIG. 10 is a schematic configuration diagram illustrating a non-destructive inspection system according to a second embodiment of the present disclosure.

FIG. 10 illustrates a schematic configuration of a non-destructive inspection system 1" according to a second embodiment of the present disclosure. The configuration of the non-destructive inspection system 1" according to this embodiment will now be described with reference to this figure. The same reference characters are given to the same components as those of the first embodiment, and a description thereof is omitted.

In the second embodiment, the non-destructive inspection system 1" calculates distance information from the position information on the neutron detector and on the neutron emission unit and the information related to the angle at which the center axis of the neutron emission intersects the center axis direction of the collimator. In addition, the non-destructive inspection system 1" estimates the amount of the water or cavity of the specific portion, using the distance information and the attenuation information.

A neutron detection unit 21 includes neutron detectors 22a to 22e capable of detecting thermal neutrons and collimators 23a to 23e for enhancing the directivity of thermal neutrons incident on the respective neutron detectors. The neutron detection unit 21 is connected to the vehicle 2 via a connection unit 24. The neutron detectors 22a to 22e are arranged in a line parallel to the traveling direction of the vehicle 2 to form an array structure.

In FIG. 10, the non-destructive inspection system 1" is placed on a bridge 101 which is an inspection object. The bridge 101 has specific portions 123 and 124 filled with water.

The neutron emission unit 12 is inclined on the vehicle 2 so as to emit neutrons toward the bridge 101. The directivity of the fast neutrons emitted from the neutron emission unit 12 is enhanced by the emission collimator, and the fast neutrons are emitted to the bridge 101. In FIG. 10, the center axis of the emitted fast neutrons is indicated by a dotted line and denoted by Nh. Although the directivity of the fast neutrons to be emitted is enhanced by the emission collimator, the fast neutrons do not need to be a completely parallel beam and may have a slight diffusion angle. In that case, the center axis of the beam of the fast neutrons diffusing with a diffusion angle is Nh in FIG. 10.

In FIG. 10, the center axes of the collimators 23a to 23e are indicated by dot-and-dash lines. The center axis of each of the collimators indicates the center of directivity of the collimator. The fast neutrons are emitted from the neutron emission unit 12 such that the center axis direction of the collimators 23a to 23e intersect the center axis of the beam of the fast neutrons at an angle θ1. Specifically, the neutron emission unit 12 emits fast neutrons such that the angle at which the center axis of the emitted fast neutrons intersect the center axis direction of each of the collimators is 10 degrees to 80 degrees. Reducing the angle deepens penetration of fast neutrons into the bridge 101, whereas increasing the angle θ1 makes penetration of fast neutrons shallower. The positions at which the fast neutrons Nh intersect the center axes of the collimators are shown by the positions 111a to 111e in FIG. 10. The fast neutrons collide with the material of the bridge 101, and some of the fast neutrons are scattered as thermal neutrons. The thermal neutrons Nsa scattered at the position 111a are detected by the neutron detector 22*a* via the collimator 23*a*. Similarly, thermal neutrons scattered at the positions 111*b* to 111*e* are detected by the neutron detectors 22*b* to 22*e*, respectively.

Figure 11:
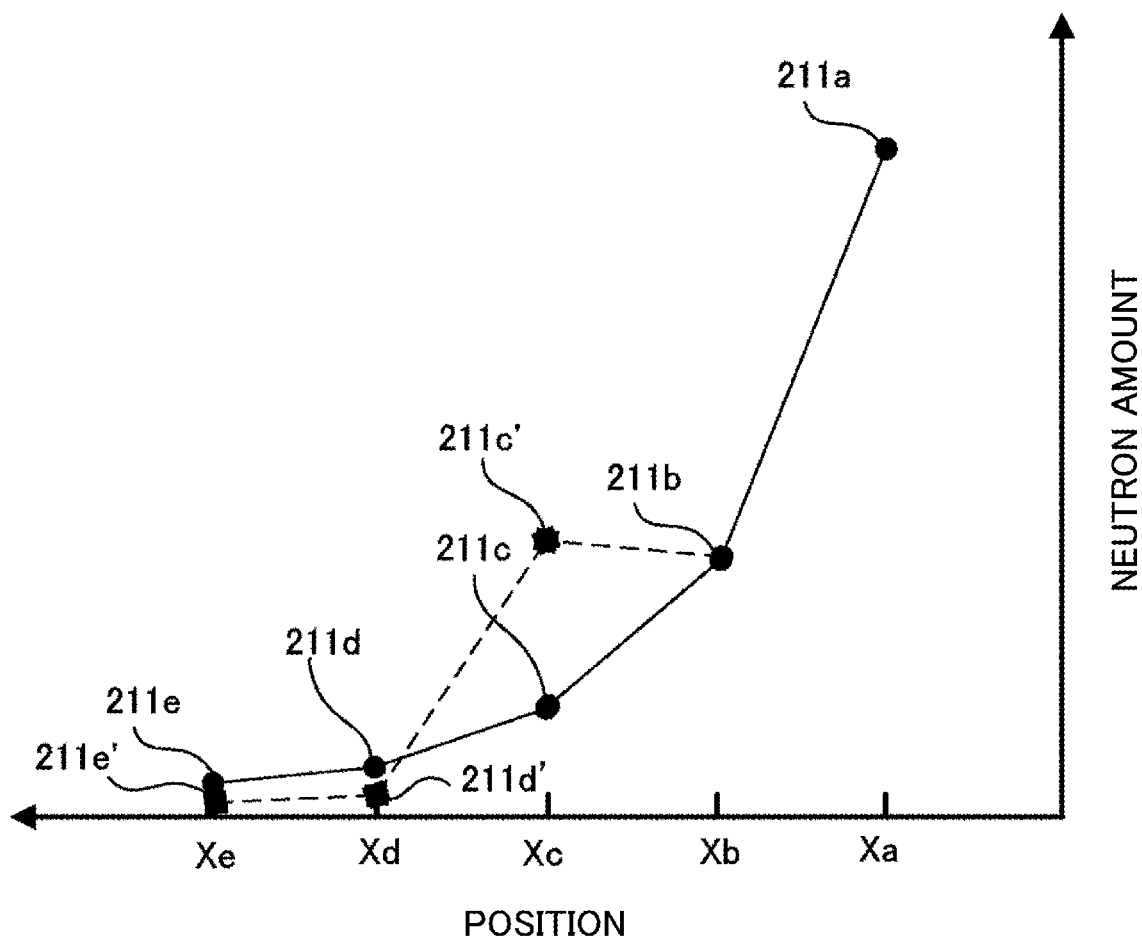
FIG. 11 is a graph illustrating a detection result by a neutron detector in the non-destructive inspection system according to the second embodiment of the present disclosure.
Figure 12:
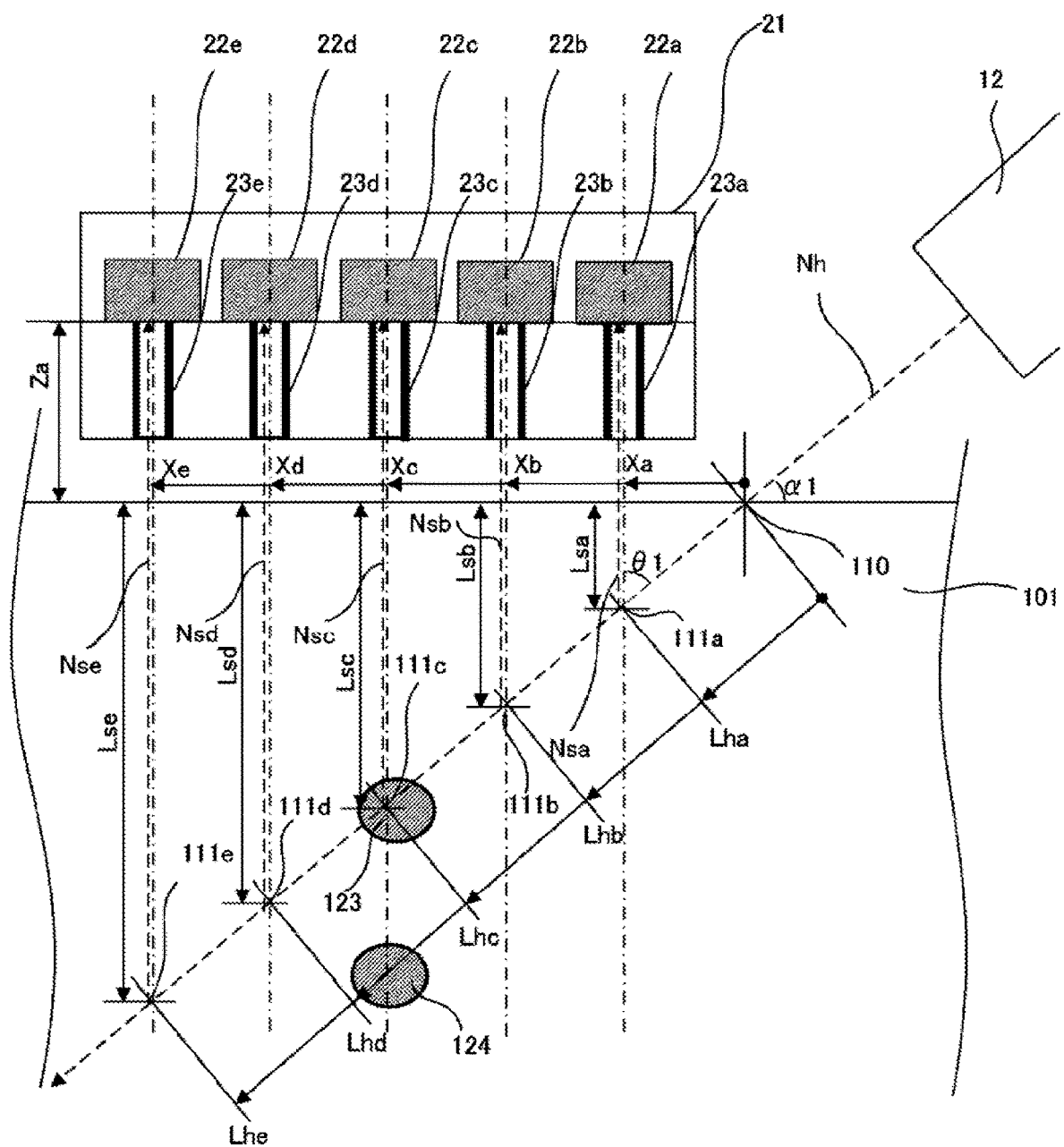
FIG. 12 is a schematic configuration diagram illustrating a positional relationship between an inspection object and a neutron detection unit in the non-destructive inspection system according to the second embodiment of the present disclosure.

Next, with reference to FIG. 11 and FIG. 12, the following describes the neutron amount, that is, a detection result by each of the neutron detectors 22*a* to 22*e* and the relationship between the bridge 101 (inspection object) and the neutron detection unit 21. FIG. 11 is a graph illustrating the neutron amount as the result detected by the neutron detectors 22*a* to 22*e*. FIG. 12 is a schematic configuration diagram illustrating the relationship between the bridge 101 and the neutron detection unit 21. Note that what has been already described with reference to FIG. 10 is omitted.

FIG. 11 is a graph illustrating the amount of the neutrons detected by the neutron detector on the vertical axis and the position of the neutron detector on the horizontal axis. The solid line represents the case where there is no specific portion in the inspection object, while the dotted line represents the case where there is a specific portion in the inspection object. The neutron amounts on the vertical axis indicate the amounts of thermal neutrons detected by the neutron detectors, and are each a value obtained by counting the amount of detected thermal neutrons. The neutron amount may be the value obtained by integration of the extraction time according to the position in the depth direction in the first embodiment. The point 211*a* represents the amount of thermal neutrons Nsa detected by the neutron detector 22*a*. The thermal neutrons Nsa are, out of the fast neutrons Nh emitted from the neutron emission unit 12, scattered through the bridge 101 as the inspection object. Similarly, the points 211*b* to 211*e* indicate the amount of the neutrons detected by the neutron detectors 22*b* to 22*e*.

Here, the attenuation of the fast neutrons Nh emitted from the neutron emission unit 12 in the process of reaching the neutron detector 22*a* will be described with reference to FIGS. 11 and 12. In FIG. 12, the center axis (i.e., the emission direction) of the fast neutrons emitted from the neutron emission unit 12 and the center axis (i.e., the detection direction) of the collimator 23*a* intersect at an angle θ1. When the center axis of the collimator 23*a* is orthogonal to the bridge 101 which is the inspection object, the incident angle α1 of the fast neutrons Nh emitted from the neutron emission unit 12 to the inspection object can be expressed by the following mathematical 2.

$$\alpha 1 = 90° - \theta 1 \quad \text{(Mathematical 2)}$$

The distance Lha of the fast neutrons Nh incident on the bridge 101 at the position 110 and reaching the position 111*a* can be expressed by the following mathematical 3, where Xa is the distance from the position 110 to the center axis of the collimator 23*a*.

$$Lha = Xa/\cos \alpha 1 \quad \text{(Mathematical 3)}$$

The fast neutrons then scatter in the material and generate thermal neutrons. The distance Lsa through which the thermal neutrons generated at the position 111*a* pass from the position 111*a* toward the surface of the inspection object (i.e., toward the neutron detector), that is, the distance information on the specific portion from the paved surface can be expressed by the following mathematical 4.

$$Lsa = Xa \cdot \tan \alpha 1 \quad \text{(Mathematical 4)}$$

Thermal neutrons emitted from the surface of the inspection object penetrate the air and are detected by the neutron detector 22*a* via the collimator 23*a*. Here, the distance of penetration through the air is defined as Za. In this case, the thermal neutron amount CNs after attenuation with respect to an emission amount CNh of the fast neutrons can be expressed by the following mathematical 5. Note that the attenuation rate of fast neutrons in the constituent material of the bridge is denoted by βh, the attenuation rate of thermal neutrons in the constituent material of the bridge is denoted by βs, and the attenuation rate of thermal neutrons in the air is denoted by Pa. The position of the position 110, Za, and Xa to Xe can be determined by measuring the position of the neutron emission unit 12 and the position of the neutron detection unit 21 in relation to the inspection object.

$$CNs \propto F(\beta h, \beta s, Lha, Lsa, Za) \cdot CNh \quad \text{(Mathematical 5)}$$

That is, the relative relationship of the amount of neutrons detected by each neutron detector is determined by each attenuation rate, the incident angle of fast neutrons, and the position of each neutron detector. The solid line in the graph of FIG. 11 satisfies the relationship of mathematical 5.

The dotted line in FIG. 11 is a graph showing the amount of neutrons where the specific portions 123 and 124 are present under the collimator 23*c*. The specific portions 123 and 124 are cracks in the bridge as defects, which are filled with water. In water, fast neutrons Nh are scattered in accordance with the amount of water and generate thermal neutrons. That is, as shown in FIG. 12, the thermal neutrons Nsc are detected by the neutron detector 22*c*. The thermal neutrons Nsc are scattered in accordance with the amount of water in the specific portion 124, out of the fast neutrons Nh incident on the specific portion 123 at the position 111*c*. As shown in FIG. 11, the neutron amount at the point 211*c*' is larger than at the point 211*c* where there is no specific portion 123. The generated thermal neutrons Nsc attenuate while passing through the distance Lsc in the concrete. Since the fast neutrons Nh to be the thermal neutrons Nsd at the position 111*d* attenuate in the specific portion 123, the point 211*d*' indicating the amount of the neutrons detected by the neutron detector 22*d* is smaller than the point 211*d*. The point 211*e*' is smaller than the point 211*e* for the same reason.

As described above, in FIG. 11, as compared to the solid-line data obtained by measurement where there is no specific portion, it can be estimated that there is the specific portion 123 at the position Xc in the horizontal direction and at the distance Lsc in the depth direction. In addition, the calculation unit 313 estimates the amount of water in the specific portion 123 by calculating the extraction time from the distance Lsc in the same manner as in the first embodiment and integrating the amount of detected neutrons during the extraction time.

Figure 14:
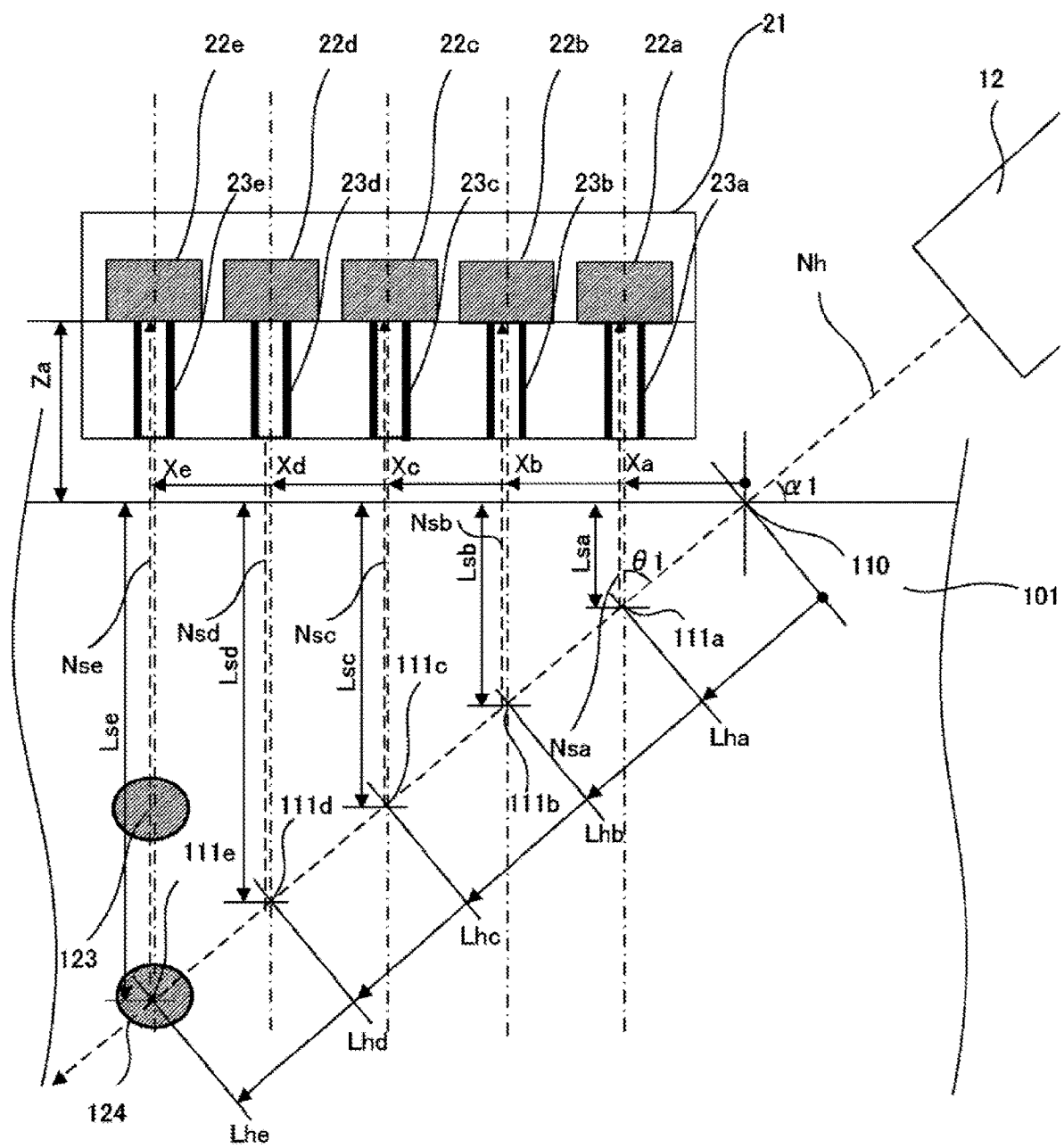
FIG. 14 is a schematic configuration diagram illustrating a positional relationship between the inspection object and the neutron detection unit in the non-destructive inspection system according to the second embodiment of the present disclosure.

Next, FIG. 14 shows the entire non-destructive inspection system 1″ moved to the right relative to the bridge 101. The fast neutrons Nh are thus emitted from the neutron emission unit 12 to the specific portion 124. The thermal neutrons Nse scattered by the water in the specific portion 124 penetrate the specific portion 123 and are detected by the neutron detector 22*e*.

Figure 13:
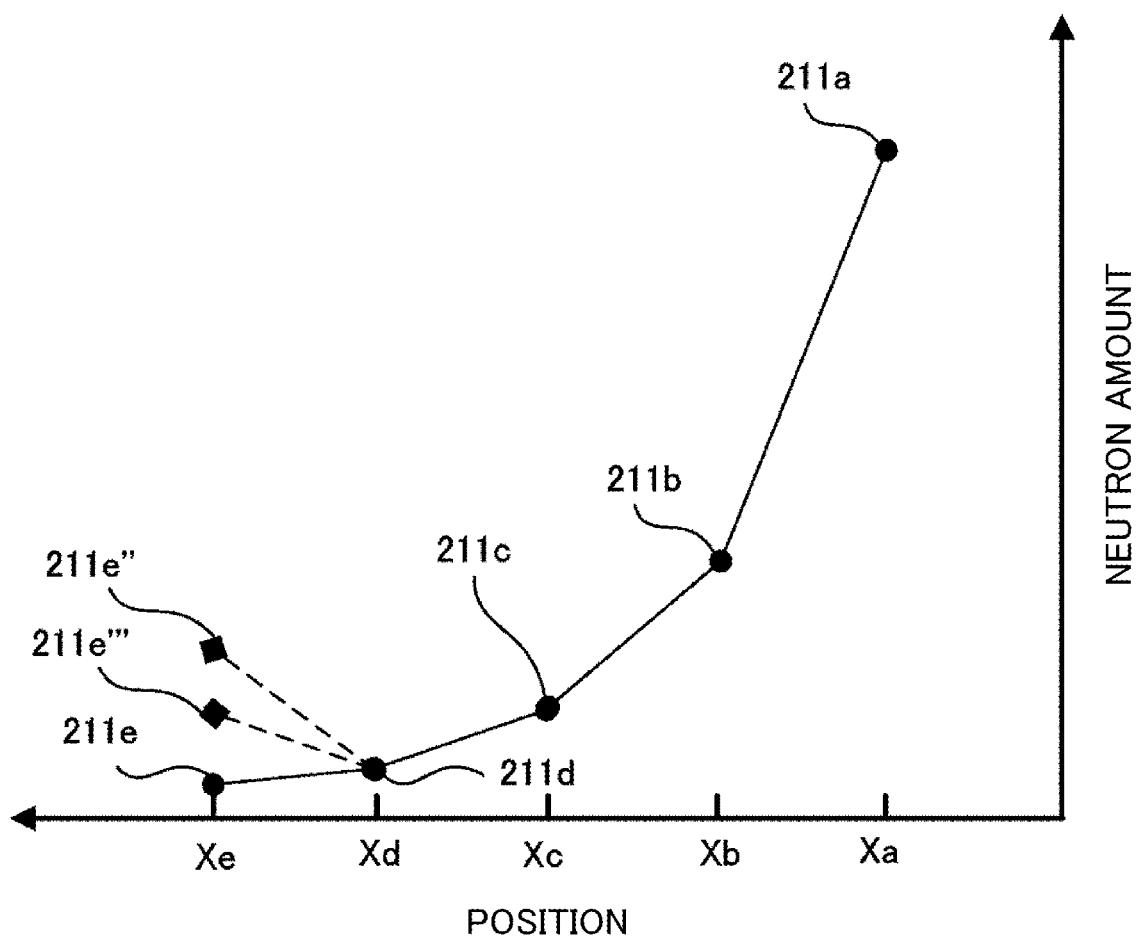
FIG. 13 is a graph illustrating a detection result by the neutron detector in the non-destructive inspection system according to the second embodiment of the present disclosure.

In FIG. 13, points 211*e*, 211*e*″, and 211*e*‴ represent the amount of neutrons detected by the neutron detector 22*e* depending on the presence or absence of a specific portion(s). The point 211*e* represents the amount of neutrons where there is no specific portion. The point 211*e*″ represents the amount of neutrons where there is only the specific portion 123. Since the amount of thermal neutrons Nse increases in accordance with the amount of water present in the specific portion 123, the neutron amount is larger at the point 211*e*″ than at the point 211*e*. The point 211*e*‴ represents the amount of neutrons where there are the specific portions 123 and 124. Since the thermal neutrons Nse scattered by the specific portion 124 attenuate while penetrating the specific portion 123, the neutron amount is smaller at the point 211$e'''$ than at the point 211$e''$. Since the amount of water in the specific portion 123 has already been estimated by the measurement before the movement of the entire non-destructive inspection system 1", the amount of attenuation may be determined based on the estimated amount. In this manner, the calculation unit 313 estimates the amount of water in the specific portion 124 by correcting the attenuation factors with respect to the amount of the neutrons detected by the neutron detector 22$e$. As compared to the solid-line data obtained by measuring where there is no specific portion, it can be estimated that the specific portion 124 exists at the position Xe in the horizontal direction and at the distance Lse in the depth direction. In this manner, the respective components are arranged so that the emission direction of the fast neutrons and the detection direction of the neutron detector are oblique. Even if there are a plurality of specific portions under the neutron detector, the respective positions, depths, and amounts (i.e., the amounts of water) of the specific portions can be estimated. Needless to mention, if there is only one specific portion, the position and depth of the specific portion and the amount of water in the specific portion can be estimated.

The embodiments of the present disclosure have been described above. The present disclosure is however not limited to the embodiments described above. In the above description, the amounts of water and cavities may be regarded as the amount of water molecules and the volume of cavities, respectively.

DESCRIPTION OF REFERENCE CHARACTERS

1, 1', 1" Non-Destructive Inspection System
2 Vehicle
3 Neutron Radiation Source System
4 Detection System
5 Control Unit
10 Power Supply Unit
11 Linear Accelerator
12 Neutron Emission Unit
14 Neutron Detector
22, 22$a$ to 22$e$ Neutron Detector
23, 23$a$ to 23$e$ Collimator
24 Connection Unit
101 Bridge
121, 121', 122, 122', 123, 124 Specific Portion
311 Controller
312 Storage Unit
313 Calculation Unit
314 Display Unit
321 Radiation Source Output Unit
322 Detector Input Unit
323 Position Input Unit

The invention claimed is:

1. A non-destructive inspection system, comprising:
 a neutron emission unit capable of emitting neutrons pulsed;
 a neutron detector capable of detecting the neutrons emitted from the neutron emission unit and penetrating through an inspection object;
 a storage unit storing attenuation information indicating a relationship between a material of the inspection object and attenuation of the neutrons; and
 a calculation unit capable of calculating distance information indicating a position of a specific portion in the inspection object in accordance with time change information which is information on a change over time in an amount of the neutrons detected by the neutron detector; and
 the calculation unit being capable of generating information related to an amount of the specific portion from information based on the amount of the neutrons according to the time change information, using the distance information and the attenuation information.

2. The non-destructive inspection system of claim 1, wherein
 the calculation unit calculates the distance information from time information on a peak of the time change information.

3. The non-destructive inspection system of claim 2, wherein
 the calculation unit calculates the amount of the specific portion from information based on the amount of the neutrons at the peak of the time change information.

4. The non-destructive inspection system of claim 3, wherein
 the calculation unit calculates an extraction time for extracting information on the amount of the neutrons from the time change information on the amount of the neutrons detected by the neutron detector based on the distance information, and calculates the amount of the specific portion in accordance with the amount of the neutrons according to the time change information at the extraction time.

5. The non-destructive inspection system of claim 3, wherein
 the calculation unit generates information related to composition of the specific portion from the time change information on the amount of the neutrons detected by the neutron detector.

6. The non-destructive inspection system of claim 2, wherein
 the calculation unit calculates the amount of the specific portion from an integrated value based on a time course according to the time change information.

7. The non-destructive inspection system of claim 2, wherein
 the calculation unit calculates an extraction time for extracting information on the amount of the neutrons from the time change information on the amount of the neutrons detected by the neutron detector based on the distance information, and calculates the amount of the specific portion in accordance with the amount of the neutrons according to the time change information at the extraction time.

8. The non-destructive inspection system of claim 2, wherein
 the calculation unit generates information related to composition of the specific portion from the time change information on the amount of the neutrons detected by the neutron detector.

9. The non-destructive inspection system of claim 2, wherein
 the neutron detector is capable of detecting neutrons back-scattered inside the inspection object.

10. The non-destructive inspection system of claim 1, wherein
 the calculation unit calculates the amount of the specific portion from an integrated value based on a time course according to the time change information.

11. The non-destructive inspection system of claim 10, wherein the calculation unit calculates an extraction time for extracting information on the amount of the neutrons from the time change information on the amount of the neutrons detected by the neutron detector based on the distance information, and calculates the amount of the specific portion in accordance with the amount of the neutrons according to the time change information at the extraction time.

12. The non-destructive inspection system of claim 10, wherein
the calculation unit generates information related to composition of the specific portion from the time change information on the amount of the neutrons detected by the neutron detector.

13. The non-destructive inspection system of claim 1, wherein
the calculation unit calculates an extraction time for extracting information on the amount of the neutrons from the time change information on the amount of the neutrons detected by the neutron detector based on the distance information, and calculates the amount of the specific portion in accordance with the amount of the neutrons according to the time change information at the extraction time.

14. The non-destructive inspection system of claim 13, wherein
the calculation unit generates information related to composition of the specific portion from the time change information on the amount of the neutrons detected by the neutron detector.

15. The non-destructive inspection system of claim 1, wherein
the calculation unit generates information related to composition of the specific portion from the time change information on the amount of the neutrons detected by the neutron detector.

16. The non-destructive inspection system of claim 1, wherein
the neutron detector is capable of detecting neutrons back-scattered inside the inspection object.

17. The non-destructive inspection system of claim 1, wherein
the neutron detector is capable of detecting neutrons that have penetrated through the inspection object.

18. A non-destructive inspection system, comprising:
a neutron emission unit capable of emitting neutrons;
a neutron detector capable of detecting the neutrons emitted from the neutron emission unit and penetrating through an inspection object;
a collimator positioned between the inspection object and the neutron detector and arranged so that the neutrons penetrating through the inspection object enter the neutron detector with predetermined directivity;
a storage unit storing attenuation information indicating a relationship between a material of the inspection object and attenuation of the neutrons; and
a calculation unit configured to perform calculation based on a result detected by the neutron detector,
the neutron emission unit being configured to emit the neutrons such that a center axis of neutron emission intersects a center axis direction of the collimator,
the calculation unit being capable of calculating distance information indicating a position of a specific portion in the center axis direction of the collimator from position information on the neutron detector and/or position information on the neutron emission unit, information related to an angle at which the center axis of the neutron emission intersects the center axis direction of the collimator, and an amount of the neutrons detected by the neutron detector, and being capable of generating information related to an amount of the specific portion based on the amount of the neutrons according to time change information, using the distance information and the attenuation information.

19. The non-destructive inspection system of claim 18, wherein
the neutron emission unit is configured to emit the neutrons such that the center axis of the neutron emission intersects the center axis direction of the collimator at an angle of 10 degrees to 80 degrees.

20. A non-destructive inspection method using:
a neutron emission unit capable of emitting neutrons pulsed;
a neutron detector capable of detecting the neutrons emitted from the neutron emission unit and penetrating through an inspection object;
a storage unit storing attenuation information indicating a relationship between a material of the inspection object and attenuation of the neutrons; and
a calculation unit capable of calculating distance information indicating a position of a specific portion in the inspection object in accordance with time change information which is information on a change over time in an amount of the neutrons detected by the neutron detector,
the method comprising:
emitting the neutrons, by the neutron emission unit, toward the inspection object;
detecting the neutrons by the neutron detector; and
generating, by the calculation unit, information related to an amount of the specific portion from information based on the amount of the neutrons according to the time change information, using the distance information and the attenuation information.

* * * * *